US 7,412,360 B2

(12) United States Patent
Surazhsky et al.

(10) Patent No.: US 7,412,360 B2
(45) Date of Patent: Aug. 12, 2008

(54) METHOD AND APPARATUS FOR SHAPE DEFORMATION AND PLACEMENT

(75) Inventors: Tatiana Surazhsky, Yokneam (IL); Gershon Elber, Nesher (IL)

(73) Assignee: Technion Research & Development Foundation Ltd., Haifa (IL)

( * ) Notice: Subject to any disclaimer, the term of this patent is extended or adjusted under 35 U.S.C. 154(b) by 735 days.

(21) Appl. No.: 10/363,220

(22) PCT Filed: Sep. 16, 2001

(86) PCT No.: PCT/IL01/00878

§ 371 (c)(1), (2), (4) Date: Mar. 6, 2003

(87) PCT Pub. No.: WO02/25587

PCT Pub. Date: Mar. 28, 2002

(65) Prior Publication Data
US 2004/0024575 A1    Feb. 5, 2004

Related U.S. Application Data

(60) Provisional application No. 60/233,479, filed on Sep. 19, 2000.

(51) Int. Cl.
    *G06F 17/10* (2006.01)
(52) U.S. Cl. ............... 703/2; 345/441; 345/442; 345/467; 345/474; 382/259; 382/100
(58) Field of Classification Search ............. 703/2; 345/441, 467, 469, 474, 622, 442, 419, 473, 345/420, 422; 382/259, 100; 358/1.2, 1.18; 206/736
See application file for complete search history.

(56) References Cited

U.S. PATENT DOCUMENTS

| 5,594,853 | A | * | 1/1997 | Salesin et al. ............... 345/441 |
| 5,611,036 | A | * | 3/1997 | Berend et al. ............... 345/441 |
| 5,734,756 | A | * | 3/1998 | Sherman et al. ............. 382/259 |
| 5,850,488 | A | * | 12/1998 | Asai et al. .................... 358/1.2 |
| 5,852,447 | A | | 12/1998 | Hosoya et al. |
| 5,857,574 | A | * | 1/1999 | Weber ......................... 206/736 |
| 5,949,435 | A | | 9/1999 | Brock et al. |
| 6,115,051 | A | * | 9/2000 | Simons et al. .............. 345/442 |
| 6,512,522 | B1 | * | 1/2003 | Miller et al. ................ 345/474 |
| 6,525,722 | B1 | * | 2/2003 | Deering ...................... 345/419 |
| 6,600,485 | B1 | * | 7/2003 | Yoshida et al. ............. 345/419 |
| 6,603,484 | B1 | * | 8/2003 | Frisken et al. .............. 345/622 |

(Continued)

OTHER PUBLICATIONS

Grimm et al., "Visual interface for solid modeling", ACM 1995.*

(Continued)

*Primary Examiner*—Paul L Rodriguez
*Assistant Examiner*—Kandasamy Thangavelu

(57) ABSTRACT

A method for deforming a plurality of shapes is described wherein each of the shapes comprises a set of parametric curves. The method comprises: providing a parametric surface, and forming a deformed shape for each of the shapes by performing a symbolic composition between the parametric surface and each parametric curve from the set of parametric curves comprising the shape being deformed. The parametric surface is defined by two parameters varying over a parametric domain, such that each of the parametric curves comprising the shapes lies in the parametric domain of the surface.

86 Claims, 15 Drawing Sheets

U.S. PATENT DOCUMENTS

| | | | | |
|---|---|---|---|---|
| 6,760,028 | B1* | 7/2004 | Salesin et al. | 345/469 |
| 6,911,980 | B1* | 6/2005 | Newell et al. | 345/441 |
| 6,912,293 | B1* | 6/2005 | Korobkin | 382/100 |
| 6,972,764 | B1* | 12/2005 | Browne | 345/467 |
| 6,975,425 | B1* | 12/2005 | Abe et al. | 358/1.18 |
| 6,992,671 | B1* | 1/2006 | Corona | 345/467 |
| 2001/0033281 | A1* | 10/2001 | Yoshida et al. | 345/420 |
| 2003/0179203 | A1* | 9/2003 | Bruderlin et al. | 345/473 |

OTHER PUBLICATIONS

Elber et al., "Adaptive Isocurve-based rendering for freedom surfaces", ACM 1996.*

Surazhsky et al. "Arbitrary precise orientation specification for layout of text", IEEE 2000.*

Sederberg et al, "Free-Form Deformation of Solid Geometric Models", *SIGGRAPH '86*, 20(4):151-160, 1986.

* cited by examiner

Keywords: Geometric design.

Fig. 15a
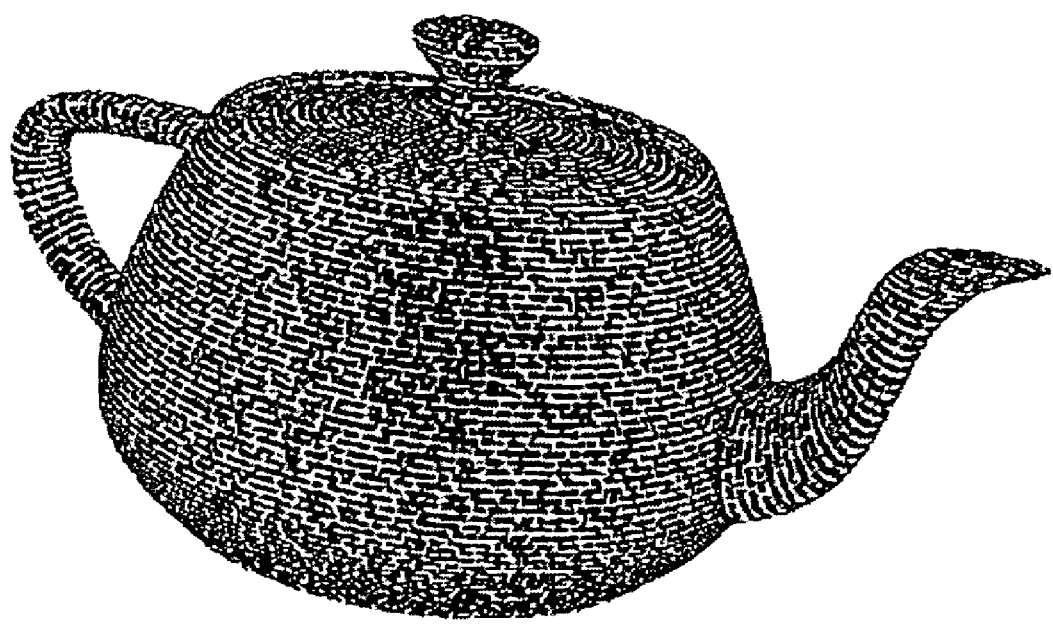
Fig. 15b

Fig. 16a          Fig. 16b
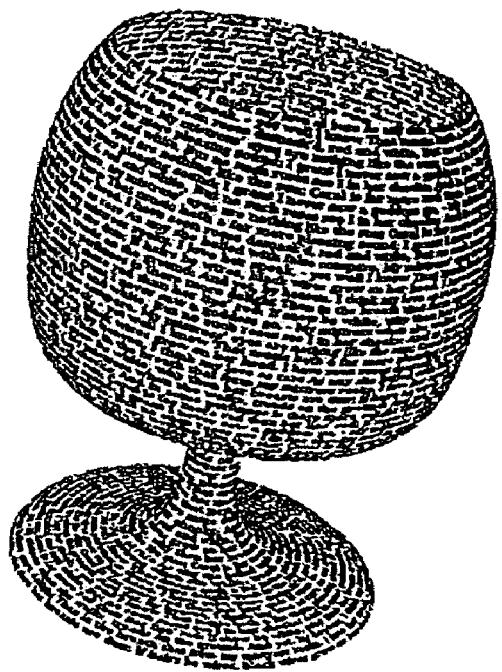
Fig. 17a          Fig. 17b

Fig. 18a
Fig. 18b
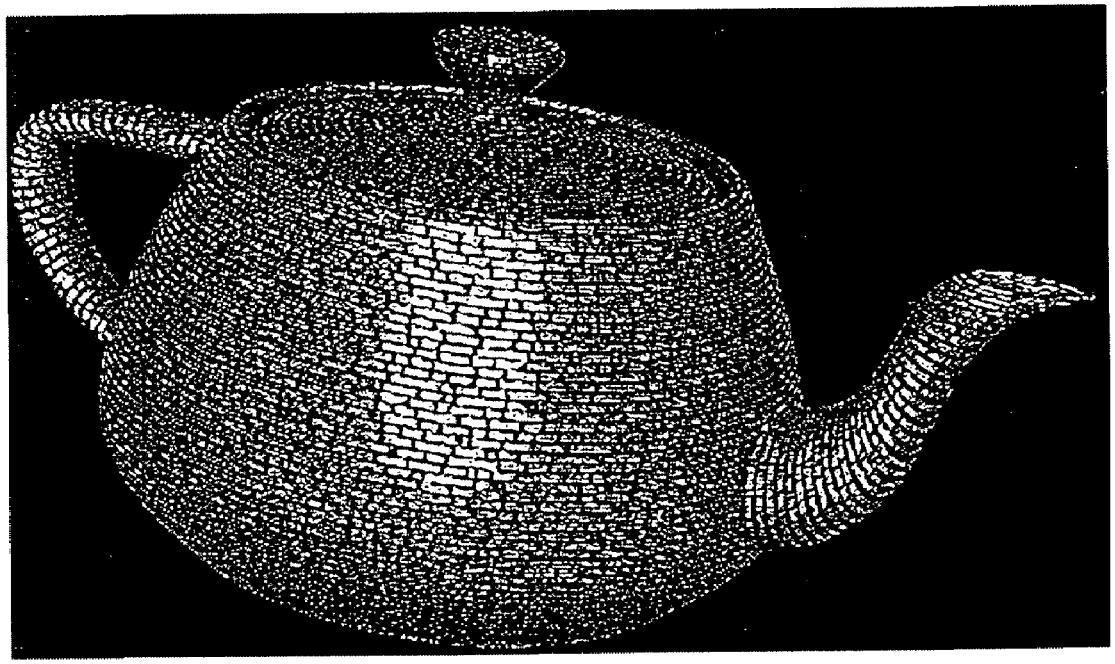
Fig. 19

METHOD AND APPARATUS FOR SHAPE DEFORMATION AND PLACEMENT

RELATED PATENT APPLICATION

This application is a National Phase Application of PCT/IL01/00878 International Filing Date 16 Sep. 2001, International Publication No. WO02/25587, International Publication Date 28 Mar. 2002, which claims priority from U.S. Provisional Patent Application No. 60/233,479 filed 19 Sep. 2000.

FIELD OF THE INVENTION

The present invention relates to shape deformation and placement and more particularly but not exclusively to text deformation and placement, especially to an arbitrary precise orientation specification for layout of text.

BACKGROUND OF THE INVENTION

A large amount of prior art exists in the area of font design and text layout for digital typography. Computer aided font design tools have been created since the 1960's. Fonts were typically rendered in media such as metal slugs or photomasks for phototypesetters. Now, fonts are frequently rendered in digital form for use in digital computers and digital display devices, in order to produce output in a particular typeface design.

A font is typically defined as a set of printable or displayable text characters of specific style and size. A design of a set of fonts is called a typeface. A wide range of character shapes exist for representing given alphanumeric characters or typographic symbols such as numbers, letters, punctuation marks and dingbats. Each such shape is distinguished by its various design features such as underlying geometry, stroke thickness, character height, serifs, joinery, placement and number of contours and ratio of thin-to-thick strokes. Existing digital font-rendering techniques can be classified into bit map type and outline type.

In the bit map rendering technique, the glyphs of the fonts are described and manipulated as explicit bit maps. A bit map representation must be provided for each font point size, as automatic sizing generally cannot be performed for a bit mapped font. Bit map rendering techniques are a direct way to display fonts. Bit mapping representations, however, consume a sizable amount of computer memory for storing the various different varieties of typefaces and the many different point sizes for each typeface. Thus, while bit map rendering techniques are often still used, other techniques are typically preferred in many circumstances, particularly when it is desirable to minimize the usage of computer memory.

An outline font is a font in which the outlines of each character are geometrically defined. Each character of such fonts is described by vector geometry and can be scaled with ease. The curves between the endpoints of the vectors are usually specified by using either cubic or linear Bezier spline curves. Spline curves are smooth piecewise polynomials that can be used to represent functions over large intervals. While the most obvious relevance of text characters is for printing and publications, other applications such as computer animation and computer aided design require text manipulation functions. Spline curves are controlled by a small set of given control points, which are often located on the outline or otherwise associated with the outline as in the case of tangent points. Popular outline fonts in use today are the True Type used by Microsoft Windows, and the Adobe's Type 1 fonts, as described in *The True Type font format specification*, Microsoft Corporation, 1990, and in *Adobe type 1 font format: multiple master extensions*, Adobe Developer Support, 1992, the contents of which are hereby incorporated by reference. Representing symbol images by outlines not only obviates large memory storage but also permits interactive font editing and text placement.

Many computerized systems employ printing methods that layout text strings along smooth lines and curves. Such algorithms are found in systems that employ outline fonts: for example the PostScript language and the Microsoft Office "WordArt" package.

In V. Ostromoukhov and R. D. Hersch, "Artistic screening", SIGGRAPH '95, (1995), pp. 219-228, the authors describe a two dimensional morphing method in which each elementary sub-screen shape is defined by a letter shape toward half-toning. This technique is applied in artistic screening, which incorporates both full size and microscopic letters into the image reproduction process.

Existing text deformation techniques perform the deformations in one of two ways. The first approach defines a best-suited rigid motion transformation for each symbol, as described in pages 171-173, of the "Program 11/Placing Text Along an Arbitrary Path" in the PostScript Language Tutorial and Cookbook. This approach is also one of the methods used by the "WordArt" package.

The second common technique maps the control points of the Bezier curves comprising the text symbol. Reed in U.S. Pat. No. 5,715,473 describes a method and apparatus for providing a set of variations of control points of a symbol image, such as a glyph, for display of at least one variation of the symbol image on a display device of a computer controlled display system. The method includes providing a set of control points specifying the outlines of the symbol image and providing variation data for specifying a set of variations for at least one of the control points. The variation data specifies a spatial manipulation of the font control, thereby modifying the outline of the symbol image.

Brock in U.S. Pat. No. 5,949,435 describes a computer-implemented apparatus and method for generating an output digital font from a base font and one or more font descriptor files. The method involves retrieving a file containing instructions and data for a generic base font, retrieving a font descriptor file containing specifications for operating upon the base font to produce the desired output font, and then generating the output font by performing operations upon the base font in accordance with the specifications contained in the font descriptor file. Brock's method produces a character program for each character in the base font.

The control point mapping method is better than rigid motion transformation, since it is more accurate. When there are enough control points to approximate the curve well by its control polygon, the deformed letters will look better. Nevertheless, neither method guarantees that the letters after the deformation will be intersection free. For the second method such intersection artifacts do not occur frequently after control point mapping, but still exist. Reference is now made to FIG. 1, which demonstrates the creation of an intersection due to control point mapping. FIG. 1a comprises straight-line segments 10 and 12, placed relative to base line 14. In FIG. 1a the undeformed linear edges of a character do not intersect each other. FIG. 1b shows the deformed base line 24, with mapped end control points and edges. The straight-line edges, 20 and 22, intersect each other, and the shape expands below the base line 24. The lengths of the dashed lines normal to the base line are unmodified.

Another problem with the control point mapping approach is that all linear segments of the symbol stay linear, with possible displeasing artifacts that affect the continuity of adjacent segments. Reference is now made to FIG. 2, which shows a simple example of this behavior. FIG. 2a comprises a letter 'A' 30, placed along a linear base line 32. The letter 'A' has several linear segments. In FIG. 2b, only the control points of the Bezier curves comprising the symbol 'A' are mapped. The linear segments forming the letter 'A' 40 remain linear, and do not follow the shape of the deformed base line 42.

In T. W. Sedergerg and S. R. Parry, "Free-form deformation of solid geometric models", *SIGGRAPH* '86, 20(4): 151-160, 1986, a freeform deformation technique is presented for solid geometric models. Given a mapping M from $R^3$ to $R^3$ and an object O from $R^3$, where $R^3$ denotes a three-dimensional space, O can be warped to follow M as M(O). M provides a precise control over the warping process. The volume deformation technique is not directly applicable to font and text design and manipulation, as these require a two-dimensional deformation.

Contents of the above books and articles are hereby incorporated by reference.

There is a need for a deformation technique for manipulation and placement of shapes over a two-dimensional or three-dimensional freeform surface, which provides precise control over all shape segments, and avoids intersections. There is a further need for a technique enabling precise placement of shapes along a specified base line, so that the shapes smoothly follow the base line.

SUMMARY OF THE INVENTION

According to a first aspect of the present invention there is thus provided a method for deforming a plurality of shapes, wherein each of the shapes comprises a set of parametric curves, the method comprising providing a parametric surface having a first and a second parameter varying over a parametric domain, such that each of the parametric curves comprising the shapes lies in the parametric domain of the surface, and for each of the shapes, forming a deformed shape according to the parametric surface by performing a symbolic composition between the parametric surface and each parametric curve from the set of parametric curves comprising the shape thereby to generate a set of deformed parametric curves.

In a preferred embodiment, the parametric surface comprises a piecewise polynomial or rational (PPR) surface.

In a further preferred embodiment, some or all of the parametric curves comprise PPR curves.

In a further preferred embodiment, a PPR surface comprises one of the following surfaces: polynomial spline, Hermite, Lagrange, Bezier, and B-spline.

In a further preferred embodiment, a PPR curve comprises one of the following curves: polynomial spline, Hermite, Lagrange, Bezier, and B-spline.

In a preferred embodiment, at least one of the curves comprises a set of control points, and wherein the method further comprises forming a parametric representation of the curve from the set of control points.

In a further preferred embodiment, the surface is provided by interfacing with a user.

Preferably, the method further comprises the steps of calculating the placement of a plurality of points along each curve from the set of deformed parametric curves comprising each of the deformed shapes, and outputting the points.

Preferably, the method further comprises the step of method displaying the plurality of deformed shapes. In the preferred embodiment, the points are displayed by one of a group of devices comprising: cathode ray tube (CRT), flat panel display, electroluminescent display, gas plasma display, liquid crystal display, laser printer, liquid crystal printer, LED printer, and inkjet printer.

In a preferred embodiment, at least one of the shapes comprises a character.

In another preferred embodiment, the shapes comprise members of an outline font.

In the preferred embodiment, the plurality of shapes comprises a sequence of shapes or a single shape.

In a preferred embodiment, the set of parametric curves comprises a single parametric curve.

Preferably, at least one of the parametric curves comprises a Bezier curve.

In a preferred embodiment, wherein the parametric surface comprises a PPR surface derived from a PPR base curve.

In a further preferred embodiment, wherein the PPR surface is further derived from a PPR shape curve.

In a preferred embodiment, the surface is planar. In a further preferred embodiment, the surface and the base curve are planar.

Preferably, performing the symbolic composition between the PPR surface and each of the PPR curves comprises converting the PPR surface into a set of polynomial or rational (PR) patches by subdividing the surface at all its internal knots, converting each of the PPR curves into a set of PR segments by subdividing the curve at each value corresponding to an internal knot of the curve and to an internal knot of the surface, and performing a symbolic composition between each of the PR patches and each PR segment within the parametric domain of the PR patch.

Preferably, the method further comprises the steps of placing the plurality of shapes along a base curve by providing a base curve, and providing the surface to be a PPR surface such that, when the second parameter equals a predefined value, the surface unites with the base curve.

In a preferred embodiment, the base curve is provided by interfacing with a user.

Preferably, the method further comprises the step of reparameterizing the base curve for arc length.

Preferably, providing the surface to be a PPR surface further comprises providing the surface such that the surface unites with a predefined shape curve when the first parameter is at any constant value in the parametric domain of the surface.

Preferably, the method further comprises the step of providing animation effects by generating successive frames of an image. The image comprises the plurality of shapes, and generating a frame comprises providing a parametric surface, and for each of the shapes, forming a deformed shape according to the parametric surface.

Preferably, generating a frame further comprises the step of placing the plurality of shapes along a base curve by providing a PPR base curve, providing the surface to be a PPR surface such that, when the second parameter equals a predefined value, the surface unites with the base curve.

Preferably, generating a frame further comprises reparameterizing the base curve for arc length.

In a preferred embodiment, the surface comprises a three dimensional parametric surface, and the method comprises the further step of placing the plurality of shapes on a predefined number of strips on the three dimensional shape by splitting the surface into the number of strips, determining the arc length of each of the strips, subdividing the plurality of shapes into the number of lines, such that each strip on the surface is associated with a subset of the shapes, wherein the size of each subset is determined by the relative arc lengths of the strips, placing each subset of shapes on the associated strip.

Preferably, placing the plurality of shapes on a predefined number of strips on the three dimensional shape further comprises the step of shading at least one of the plurality of shapes.

Preferably, shading one of the shapes comprises controlling the width of at least one of the curves comprising the shape. In a preferred embodiment, shading one of the shapes comprises assigning a weight to the shape thereby to control a property thereof. In a further preferred embodiment, the shading is determined by at least one of the following factors: light intensity, light direction, viewing direction, direction of the reflected light, ambient light, diffuse light, specular light, silhouette enhancement, and distance.

In a preferred embodiment, the shading comprises color shading. Preferably, the weighting comprises a vector thereby to provide color shading.

According to a second aspect of the present invention there is thus provided a shape deformer for deforming a plurality of shapes, wherein each of the shapes comprises a set of parametric curves, the deformer comprising a surface provider for providing a parametric surface having a first and a second parameter varying over a parametric domain, such that each of the parametric curves comprising the shapes lies in the parametric domain of the surface, a shape transformer for forming each of the shapes into a deformed shape according to the parametric surface, by performing for each of the shapes a symbolic composition between the parametric surface and each parametric curve from the set of parametric curves comprising the shape, to generate a set of deformed parametric curves.

In a preferred embodiment, the parametric surface comprises a PPR surface. In a further preferred embodiment, some or all of the parametric curves comprise PPR curves.

In a preferred embodiment, the shape deformer further comprises an interface for interfacing with a user thereby to provide the surface.

In a preferred embodiment, at least one of the curves comprises a set of control points, and the shape deformer further comprises a curve regenerator for forming a parametric representation of the curve from the set of control points.

In a preferred embodiment, the shape deformer further comprises a calculator for calculating the placement of a plurality of points along each curve from the set of deformed parametric curves comprising each of the shapes, and an output device for outputting the points. In another preferred embodiment, the shape deformer further comprises a display device for displaying the deformed plurality of shapes. Preferably, the display device comprises one of a group of devices including but not limited to: cathode ray tube (CRT), flat panel display, electroluminescent display, gas plasma display, liquid crystal display, laser printer, liquid crystal printer, LED printer, and ink-jet printer.

In a preferred embodiment, at least one of the shapes comprises a character.

In another preferred embodiment, the shapes comprise members of an outline font.

In the preferred embodiment, the plurality of shapes comprises a sequence of shapes or a single shape.

In a preferred embodiment, the set of parametric curves comprises a single parametric curve.

Preferably, at least one of the parametric curves comprises a Bezier curve.

In a preferred embodiment, wherein the parametric surface comprises a PPR surface derived from a PPR base curve.

In a further preferred embodiment, wherein the PPR surface is further derived from a PPR shape curve. In a further preferred embodiment, the parametric surface comprises a B-spline surface derived from a B-spline base curve.

In a preferred embodiment, the surface is planar. In a further preferred embodiment, the surface and the base curve are planar.

Preferably, the shape transformer comprises a surface subdivider for converting the surface into a set of PR patches by subdividing the PPR surface at all its internal knots, and a compositioner for performing a symbolic composition between the each of the PPR curves and the set of Bezier surfaces. Preferably, the compositioner further comprises a curve subdivider for converting each of the PPR curves into a set of PR segments by subdividing the curve at each value corresponding to an internal knot of the curve and to an internal knot of the surface, and a sub-compositioner for performing a symbolic composition between each of the PR patches and the corresponding PR segments.

In a preferred embodiment, the shape deformer further comprises a shape placer for placing the plurality of shapes along a base curve, wherein the shape placer comprises a base curve provider for providing a PPR base curve, and wherein the surface provider is operable to provide the surface to be a PPR surface such that, when the second parameter equals a predefined value, the surface unites with the base curve.

Preferably, the interface is further operable to interface with a user thereby to provide the base curve.

In a preferred embodiment, the shape deformer further comprises a base curve reparameterizer for reparameterizing the base curve thereby to resize the shapes. Preferably, the base curve reparameterizer is operable to reparameterize the base curve such that the sizing of the shapes after deformation corresponds to the sizing of the shapes prior to deformation. In a preferred embodiment, wherein the base curve reparameterizer is operable to reparameterize the base curve such that selected shapes are emphasized.

In a preferred embodiment, the surface provider is operable to provide the surface to be a PPR surface such that the surface unites with a predefined PPR shape curve when the first parameter is at any constant value in the parametric domain of the surface.

In a preferred embodiment, the shape deformer further comprises an animator for generating successive frames an image, the image comprising the set of shapes, wherein for each frame the animator is operable to provide a parametric surface, to form a deformed plurality of shapes according to the parametric surface, to calculate the placement of a plurality of points along each of the deformed shapes, and to output the points. Preferably, n the animator is further operable to place the plurality of shapes along a PPR base curve by providing the surface to be a PPR surface such that, when the second parameter equals a predefined value, the surface unites with the base curve. In a preferred embodiment, the animator is further operable to reparameterize the base curve for arc length.

In a preferred embodiment, the shape deformer further comprises a 3D placer for placing the plurality of shapes on a predefined number of strips on the three dimensional shape, the 3D placer comprising a surface splitter for splitting the surface into the number of strips, an arc length measurer for determining the arc length of each of the strips, a subdivider for subdividing the plurality of shapes into the number strips, such that each strip on the surface is associated with a subset of the shapes, wherein the size of each subset is determined by the relative lengths of the strips, and a line placer placing each subset of shapes on the associated strip.

Preferably, 3D placer further comprises a shader for shading at least one of the plurality of shapes.

Preferably, shading one of the shapes comprises controlling the width of at least one of the curves comprising the shape. In a preferred embodiment, shading one of the shapes comprises assigning a weight to the shape thereby to control a property thereof. In a further preferred embodiment, the shading is determined by at least one of the following factors: light intensity, light direction, viewing direction, direction of the reflected light, ambient light, diffuse light, specular light, silhouette enhancement, and distance.

In a preferred embodiment, the shading comprises color shading. Preferably, the weighting comprises a vector thereby to provide color shading.

According to a third aspect of the present invention there is thus provided a computer program product directly loadable into the internal memory of a digital computing device, comprising software code portions for deforming a plurality of shapes, wherein each of the shapes comprises a set of parametric curves, by performing the steps of providing a parametric surface having a first and a second parameter varying over a parametric domain, such that each of the parametric curves comprising the shapes lies in the parametric domain of the parametric surface, for each of the shapes, forming a deformed shape according to the parametric surface by performing a symbolic composition between the parametric surface and each parametric curve from the set of parametric curves comprising the shape thereby to generate a set of deformed parametric curves when the product is run on the computing device.

In a preferred embodiment, the product is located on a server for download into the digital computing device via a computer network. In another preferred embodiment, the product is located on one of a group of storage media comprising: compact disc (CD), digital versatile disc (DVD), floppy disk, hard disk, and magnetic tape.

In a further preferred embodiment, the computer program product comprises further software code portions for performing the steps of calculating the placement of a plurality of points along each curve from the set of deformed parametric curves comprising each of the shapes, and outputting the points. In a further preferred embodiment, the computer program product comprises further software code portions for performing the step of displaying the plurality of deformed shapes.

In a preferred embodiment, the shapes comprise members of an outline font.

In a preferred embodiment, at least one of the parametric curves comprises a Bezier curve.

In a further preferred embodiment, the parametric surface comprises a B-spline surface derived from a B-spline base curve.

Preferably, the parametric surface comprises a PPR surface and all of the parametric curves comprise PPR curves, and wherein performing the symbolic composition between the surface and each of the PPR curves comprises the steps of converting the PPR surface into a set of PR patches by subdividing the surface at all its internal knots, converting each of the PPR curves into a set of PR segments by subdividing the curve at each value corresponding to an internal knot of the curve and to an internal knot of the surface, and performing a symbolic composition between each of the PR patches and each PR segment within the parametric domain of the PR patch.

In a preferred embodiment, the computer program product comprises further software code portions for performing the step of placing the plurality of shapes along a base curve by providing a base curve, providing the surface to be a PPR surface such that, when the second parameter equals a predefined value, the surface unites with the base curve.

In a preferred embodiment, the computer program product comprises further software code portions for software code portions for performing the step of reparameterizing the base curve for arc length.

In a further preferred embodiment, the computer program product comprises further software code portions for providing animation effects by generating successive frames of an image, the image comprising the plurality of shapes, wherein generating a frame comprises providing a parametric surface, and for each of the shapes, forming a deformed shape according to the parametric surface.

In another preferred embodiment, the surface comprises a three dimensional parametric surface, and the computer program product comprises further software code portions for performing the step of placing the plurality of shapes on a predefined number of strips on the three dimensional shape by splitting the surface into the number of strips, determining the arc length of each of the strips, subdividing the plurality of shapes into the number strips, such that each strip on the surface is associated with a subset of the shapes, wherein the size of each subset is determined by the relative arc lengths of the strips, and placing each subset of shapes on the associated strip.

Preferably, the computer program product comprises further software code portions for performing the step of shading at least one of the plurality of shapes.

BRIEF DESCRIPTION OF THE DRAWINGS

For a better understanding of the invention and to show how the same may be carried into effect, reference will now be made, purely by way of example, to the accompanying drawings, in which:

FIGS. 15A, 15B show examples of shape placement over the surfaces of the Utah teapot using the cosine shading model, Ic.

FIGS. 16A, 16B show examples of a text layout over a spherical surface.

FIGS. 17A, 17B show examples of the application of the silhouette and the distance shaders.

FIGS. 18A, 18B show the Utah teapot model rendered using a shader that enhances silhouette areas in the object.

FIG. 19 shows a Utah teapot with the intensities negated with the respect to those in FIG. 15.

DESCRIPTION OF THE PREFERRED EMBODIMENTS

The availability of a variety of electronic printing tools and devices has changed the role of typography. Nowadays, text manipulation functions are an integral part of a large body of applications such as multi-media publishing, computer animation, and computer aided design (CAD) systems. Computer aided font design tools have been created since the 1960, but even today font design systems generally require the support of a human artist. Current font design and manipulation systems for outline fonts generally recalculate a character's control points, in order to provide character shape variation and to place a character sequence along a line. Such techniques do not provide a full and precise specification of the resultant text layout and form.

Figure 1A:
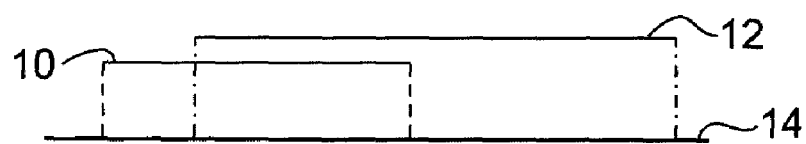
FIGS. 1A, 1B demonstrate the creation of an intersection due to control point mapping.
Figure 1B:
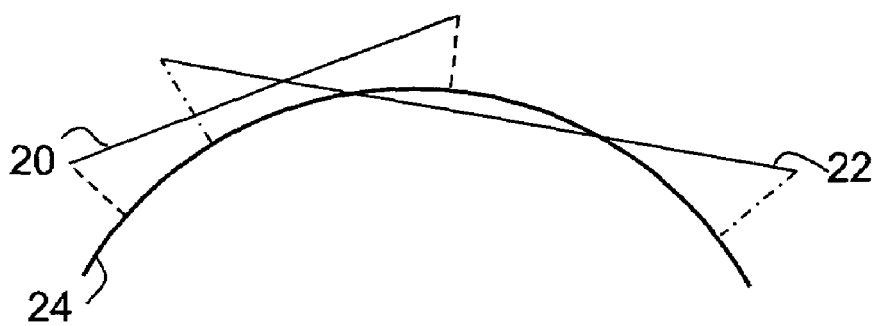
Figure 2A:
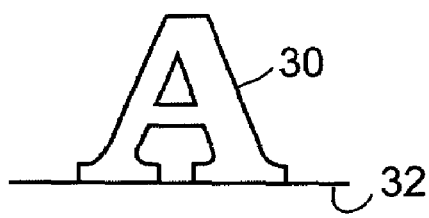
FIGS. 2A, 2B show a shape deformed by control point mapping.
Figure 2B:
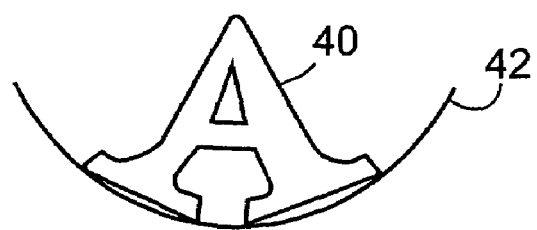
Figure 3:
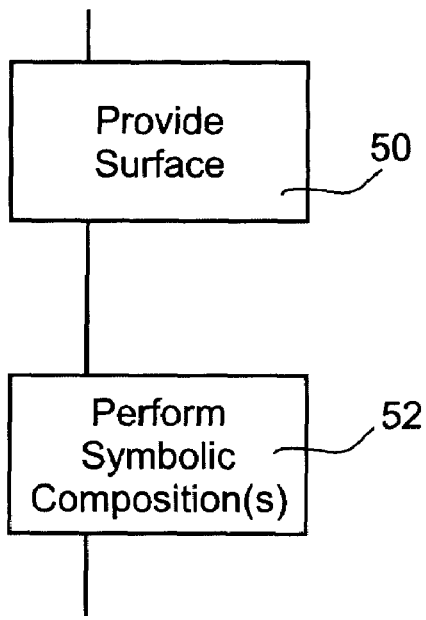
FIG. 3 is a simplified flow chart of an embodiment of a method for deforming one or more shapes.

Reference is now made to FIG. 3, which is a simplified flow chart of an embodiment of a method for deforming one or more shapes. The preferred embodiment is applicable to parametric curves and parametric surfaces. Each of the shapes is defined by one or more parametric curves. In step 50 a parametric surface S(u,v) is provided. The parametric surface has two parameters, u and v, which vary over a parametric domain. The surface is provided so that each of the curves comprising the shapes to be deformed lies in the parametric domain of the surface. In step 52, the shapes are deformed according to the provided parametric surface by performing a symbolic composition between the parametric surface and each of the parametric curves comprising the shape or shapes.

A further preferred embodiment is for parametric curves and/or surfaces comprising piecewise polynomial or rational (PPR) curves and/or surfaces, such as polynomial splines, Hermite, Lagrange, Bezier, and B-spline curves and surfaces.

PPR surfaces consist of one or more polynomial or rational (PR) surface patches, joined together at internal knots. Likewise, PPR curves consist of one or more adjoining polynomial or rational (PR) curve segments.

Symbolic composition is a mathematical operation that combines several functions in sequence. Given y=f(t) and t=g(r), symbolic composition yields y=h(r)=f(g(r)) as the composed function. For example, if $y=t^2$ and t=r*2, then $y=h(r)=(r*2)^2=4*r^2$. Note that no explicit numeric evaluation is conducted during symbolic composition. Thus, a given parametric curve $C(t)=\{c_x(t),c_y(t)\}$ is deformed by performing:

$$C(t) \rightarrow S \circ C(t) = S(c_x(t), c_y(t))$$

for $c_x$ and $c_y$ in the parametric domain of the surface S(u, v).

The method described above applies to deforming a single shape or a sequence of shapes. Additionally, a shape may be defined as a single parametric curve or as a set of curves. The characters and symbols of an outline font are usually specified as linear or cubic Bezier curves, making the method directly applicable to these symbols.

In some cases, such as Bezier curves, a PPR curve is defined as a set of control points. A linear Bezier curve is specified by two control points and a cubic Bezier curve by four control points. The preferred embodiment further comprises a step of forming a parametric representation of the curve from a set of control points, in order to deform curves defined by control points.

The method of FIG. 3 results in a set of deformed parametric curves which have not been explicitly evaluated. In a preferred embodiment, the deformed curves are output as control points. Some existing applications, such as PostScript, support the further processing of such unevaluated curves.

Figure 4:
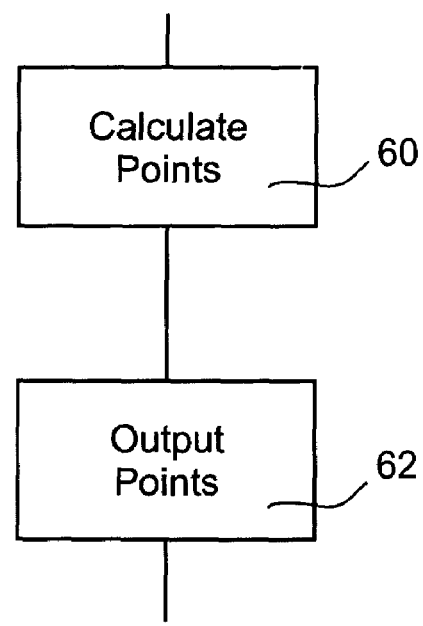
FIG. 4 is a simplified flow chart of further steps of the method of FIG. 3, for outputting points of a deformed shape or shapes.

The following preferred embodiment provides extra steps to provide output points for applications which require a more explicit description of the deformed shapes. Reference is now made to FIG. 4 which is a simplified flow chart of further steps of the method of FIG. 3, for outputting points of a deformed shape or shapes. First, the placement of a plurality of points along each curve from the set of deformed parametric curves comprising the deformed shape is calculated in step 60. These points are then output in step 62. The preferred embodiment further comprises a step of displaying the deformed shapes. The display device comprises one of a group of devices, including: a cathode ray tube (CRT), a flat panel display, a electroluminescent display, a gas plasma display, a liquid crystal display, a laser printer, a liquid crystal printer, an LED printer, and an ink-jet printer.

A symbolic composition is computed over PR functions. A PPR surface may contain more than one PR patch, and a PPR curve may contain more than one PR segment. Performing a symbolic composition between PPR curves and surfaces generally requires subdividing the curve and/or surface into its PR components, and performing separate symbolic compositions between the PR components. For example, B-spline freeform curves are piecewise polynomials, whereas Bezier curves are polynomials. Hence, a single B-spline curve or surface consists of one or more Bezier curves and/or surfaces. In order to perform a symbolic composition and deform a B-spline curve, the B-Spline freeform must be subdivided into its polynomial pieces. A B-spline surface that is derived from a B-spline base curve may be converted into a set of Bezier surfaces by subdividing the B-spline surface at all its internal knots. Further, by subdividing all the Bezier curves that prescribe the geometry of a character at the corresponding knot values of the surfaces, the deformation process is performed as a symbolic composition between the groups of Bezier curves and the corresponding subdivided Bezier patches.

In the preferred embodiment where the parametric surface comprises a PPR surfaces and the shapes are defined by a set of PPR curves, the symbolic composition between the PPR surface and the set of PPR curves is performable by subdividing the curves and surfaces into PR components. All the PPR curves of the letters are in the parametric space of S(u, v) and are to be subdivided at the certain interior knot value $u_0$ (or $v_0$) of S(u, v). Assume $u_{min}$ and $u_{max}$ are the minimal and the maximal values of the u parameter in the parametric domain of S(u,v), while $v_{min}$ and $v_{max}$ are the bounds of the parameter v. Subdividing a curve at the coordinate $u_0 \in [u_{min}, u_{max}]$ is equivalent to solving $c_u(t)=u_0$ for all t that satisfy the equation. The solution set may then be found analytically, by solving either a linear or a cubic equation and considering only real roots in the range $[u_{min}, u_{max}]$. Since outline fonts are often defined as sets of linear and cubic Bezier curves, deformation of outline font characters may generally be performed analytically. The above technique is described in G. Elber, "Symbolic and numeric computation in curve interrogation". *Computer Graphics forum,* 14(1): 25-34, March 1995, contents of which are hereby incorporated by reference.

Figure 5:
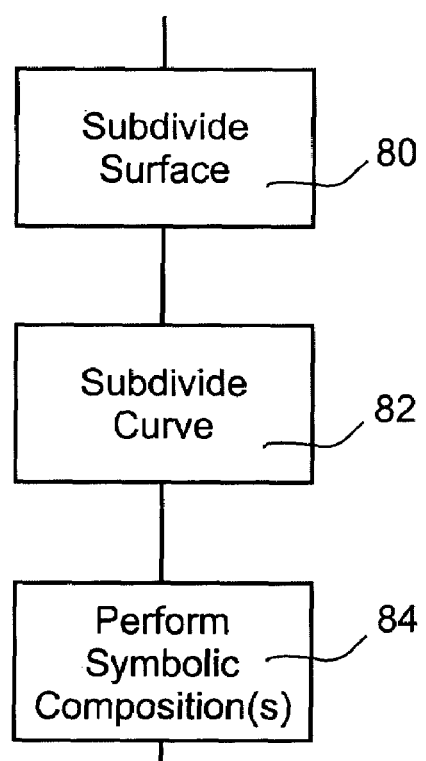
FIG. 5 is a simplified flow chart of an embodiment of a method for performing the symbolic composition between a piecewise polynomial or rational (PPR) surface and the set of PPR curves comprising the shape or shapes being deformed.

Reference is now made to FIG. 5, which shows a simplified flow chart of a method for performing the symbolic composition between a PPR surface and the set of PPR curves comprising the shape or shapes being deformed. The PPR surface need not be planar. In the case that the shapes being deformed are located on a flat surface such as a printed page, the surface is planar. In step 80 the PPR surface is converted into a set of PR surfaces, by subdividing the PPR surface at all its internal knots. In step 82, the each of the PPR curves comprising the shapes is converted into a set of PR segments by subdividing each PPR curve at each value corresponding to an internal knot of the curve and also at each value corresponding to an internal knot of the surface. In the case where a PPR curve is a Bezier curve, the curve itself comprises a single segment having no knots. Each Bezier curve must therefore be subdivided only at the internal knots of the surface. In step 84, a symbolic composition is performed between each of the PR surface patches and each of the PR curve segments within the parametric domain of the PR patch.

Figure 6:
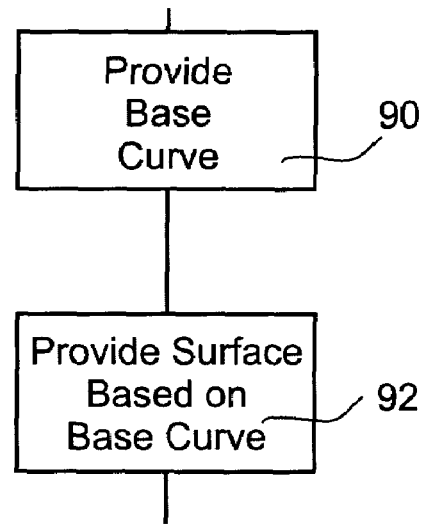
FIG. 6 is a simplified flow chart of further steps of the method of FIG. 3, for placing a plurality of shapes along a base curve.

Reference is now made to FIG. 6, which is a simplified flow chart of further steps of the method of FIG. 3. Performing these further steps provides the ability to place the plurality of shapes along a base curve. In step 90, a base curve $\gamma(t)$ is provided:

$$\gamma:[\gamma_{min},\gamma_{max}] \to \Re^2; \gamma(t)=\{x(t),y(t)\}$$

In step 92, the parametric surface used for deforming the plurality of shapes is provided to be a parametric surface such that, when v equals a predefined value $v_0$, the surface unites with provided base curve, yielding:

$$S:[u_{min},u_{max}] \times [v_{min},v_{max}] \to \Re^2; S(u, v)=\{x(u, v), y(u, v)\}; S(u, v_0)=\gamma(u)$$

Using the surface provided in step 92 to deform the shapes causes the shapes to be placed along the base curve $\gamma(t)$. The method of FIG. 6 prevents self intersections, as shown below.

The above embodiment is extendable to other dimensions. The dimension of the range of the curve must fit the dimension of the domain of the embedding entity, and hence must be a mapping to $R^2$ for the case of a domain of a surface S(u,v). The range of surface S(u, v) may be of an arbitrary dimension, $R^1$ to $R^n$, and the result of the composition can be in an arbitrary dimension n, where n=2 is a planar result and n=3 is a three dimensional result. Different dimensions, other than 2 and 3, in the range and domain of the composed entities may be obtained by composing other dimensional entities such as a curve embedded in a curve (a reparametrization), or of curves and surfaces embedded in trivariate volumes f(u, v, w) that serve as mapping and warping functions. However, the meaning of these dimensions is application dependent.

Figures 7A, 7B, 8:
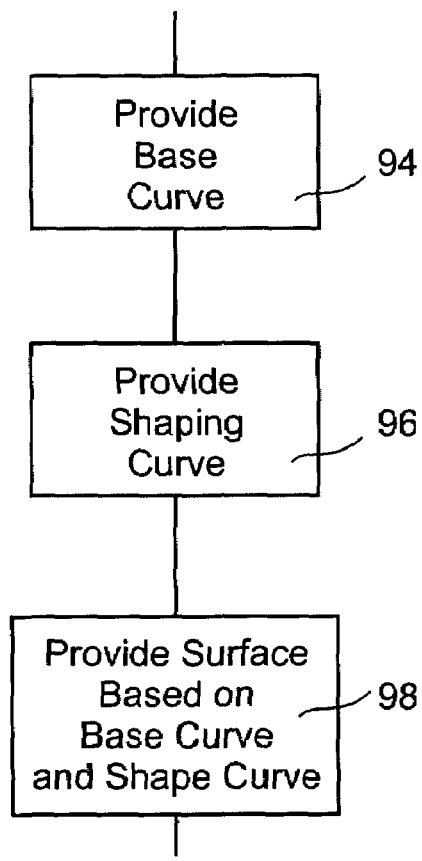
FIGS. 7A, 7B show examples of text strings placed along a base curve where the character's shape follows a shape curve.
FIG. 8 is a flow chart of a further steps of the method of FIG. 3, for placing the plurality of shapes along a base curve so that the shape are deformed in accordance with a shape curve.

In a preferred embodiment, surface S(u,v) is defined by a shape curve $\delta(v)$ as well as by base curve $\gamma(u)$, in order to define the shaping as well as the placement of the deformed shapes. The surface follows the shape curve when parameter v is at any constant value in the parametric domain of S(u,v). For example, define:

$$S(u, v)=\gamma(u)+\delta(v)$$

where $\delta(v) = S(umin,v)$ is a vertically oriented parametric curve, while $\gamma(u)=S(u,vmin)$ is the base line curve as before. After shape deformation, the base curve of the given text follows $\gamma(u)$, but the character's shape follows $\delta(v)$. FIGS. 7A, 7B show two examples of text strings that were shaped using this method.

An additional preferred embodiment defines surface S(u,v) as ruled surface between the base curve $\gamma(u,v_{min})$ and an upper boundary curve $\gamma(u,v_{max})$:

$$S(u,v)=S(u,0)(1-v)+S(u,1)v.$$

The upper boundary curve can be provided as an offset of the given base curve, or as a vertical offset of the base curve.

Reference is now made to FIG. 8 which is a flow chart of further steps of the method of FIG. 3, for placing the plurality of shapes along base curve $\gamma(t)$ so that the shape are deformed in accordance with shape curve $\delta(t)$. In step 94, base curve $\gamma(t)$ is provided. In step 96, shape curve $\delta(t)$ is provided. Finally, in step 98, a surface is provided based on base curve $\gamma(t)$ and shape curve $\delta(t)$ as discussed above.

Figures 9A, 9B:
FIGS. 9A, 9B show a linear strip containing a text string and a base curve $\gamma(t)$.

The method described above provides great flexibility for text deformation and placement, while ensuring precise control of the resulting text. Reference is now made to FIG. 9a, which shows a linear strip containing a text string, and to FIG. 9b which shows a base curve $\gamma(t)$. The text is surrounded by a rectangular bounding box. Various choices of surface S(u, v) yield different deformation effects. The following examples illustrate some of the achievable effects.

Figure 10A:
FIGS. 10A, 10B, 10C show deformed strings containing the text of FIG. 9.
Figure 10B:
Figure 10C:
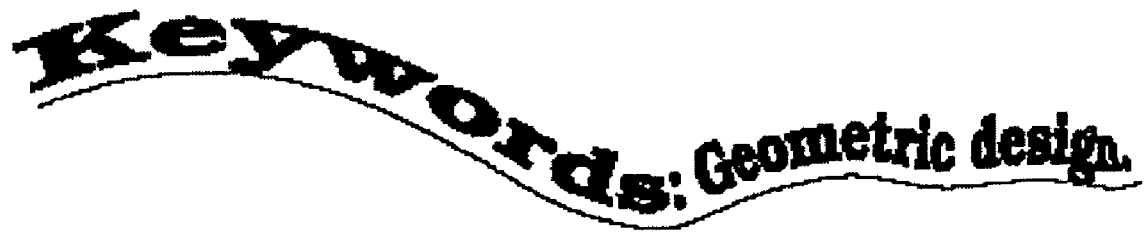

Reference is now made to FIG. 10, which shows several deformed strings containing the text of FIG. 8a. FIG. 10a shows the layout of the text string of FIG. 8 after placement along base curve $\gamma(t)$ according to the method of the preferred embodiment. The text string of FIG. 10a follows the curvature of base curve $\gamma(t)$, however the relative sizing of the individual characters has undergone some distortion due to the varying arc length along the base curve. In a preferred embodiment the mapping of the shapes along the base curve is redistributed by performing base curve reparameterization, as described in G. Elber, "Symbolic and numeric computation in curve interrogation", *Computer Graphics forum,* 14(1), 25-34, March 1995, contents of which are hereby incorporated by reference. Base curve reparameterization enables sizing the deformed shapes according to various criteria, for example to recover the relative sizing of the shapes prior to deformation as shown in FIG. 10b, or to emphasize selected shapes as shown in FIG. 10c.

A second example, which is of shape deformation and placement along a predefined base curve, is shown in FIG. 11.

Figure 11A:
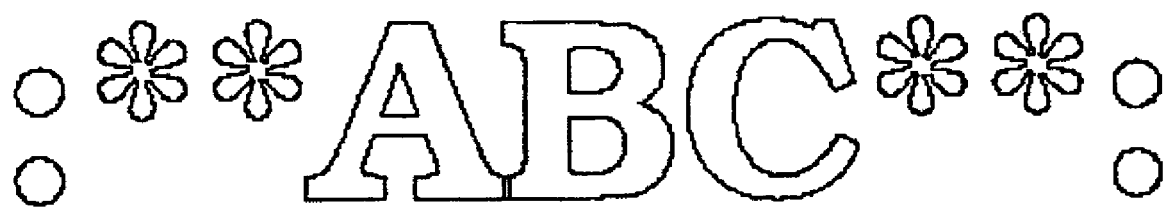
FIGS. 11A, 11B show examples of shape deformation and placement along a predefined base curve.
Figure 11B:
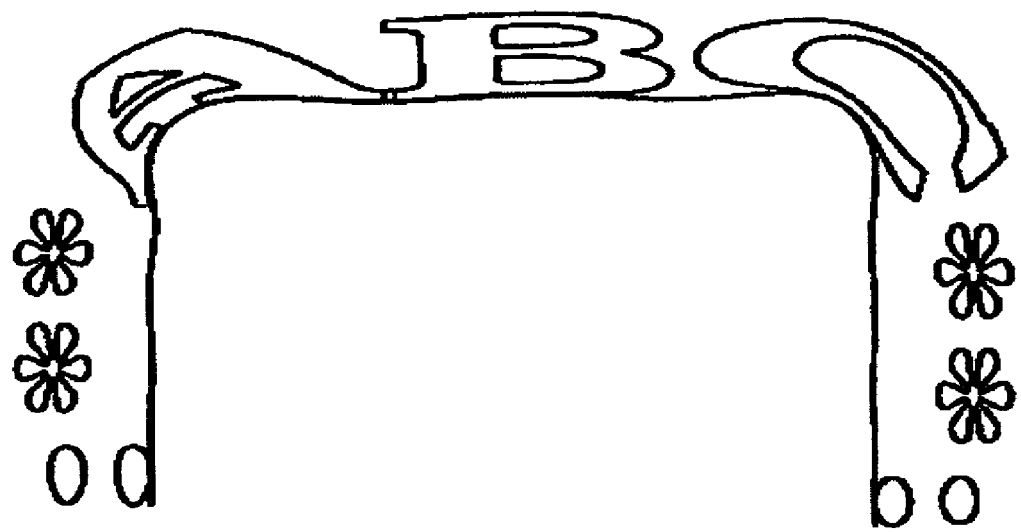

An undeformed set of shapes is shown in FIG. 11a. FIG. 11b shows the resulting shapes after being laid out over a highly curved base curve according to the present embodiment. The resulting shapes follow the base curve smoothly.

The shape deformation method described above may be used to create animation effects. Animation is the time dependent presentation of shapes. Animation simulates movement by displaying a series of pictures, or frames. Each frame is a single image in a sequence of images. Whereas video takes continuous motion and breaks it up into discrete frames, animation starts with independent pictures and puts them together to form the illusion of continuous motion. Examples of animation include blinking, dissolving, and swiping, that is, the brightening of successive text portions at a specified rate.

Given an image comprising a shape or a plurality of shapes, where each shape is defined by one or more parametric curves, an animated effect is created by generating successive frames of the image by deforming the image onto a succession of parametric surfaces.

Figure 12:
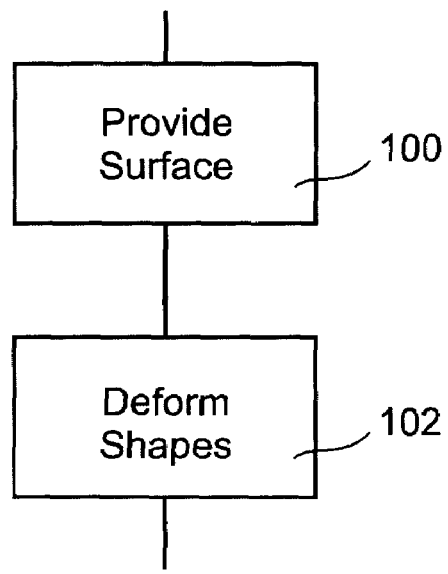
FIG. 12 is a simplified flow chart of a method for generating a frame.

Reference is now made to FIG. 12, which shows a simplified flow chart of a method for generating a frame. In step 100 a parametric surface is provided. Each of the shapes is then deformed according to the parametric surface in step 102. Different sequences of parametric surfaces create different animation effects including, but not limited to, stretching and/or shrinking the shapes, ripple effects, and morphing between given shapes. Additional preferred embodiments of the animation method include the steps of shape placement and/or reparameterization by arc length as described above. Another preferred embodiment includes the further steps of calculating points along the deformed shapes, and outputting the calculated points. In a preferred embodiment the base curve is metamorphed, and the plurality of shapes is placed along the curves of the metamorphosis sequence. Metamorphing a shape comprises generating a sequence of base curves, from which a sequence of surfaces is derived. The shape or shapes are then deformed according to the derived sequence of surfaces to create an animated effect.

Figure 13:
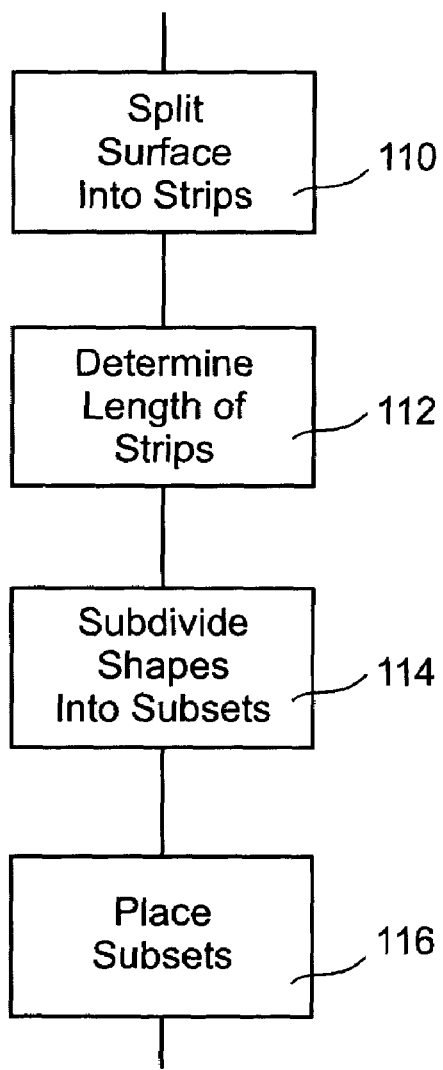
FIG. 13 is a simplified flow chart of further steps of the method of FIG. 3, for placing a plurality of shapes on a predefined number of strips on a three-dimensional parametric surface.

Reference is now made to FIG. 13 which is a simplified flow chart of further steps of the method of FIG. 3, for placing a plurality of shapes on a predefined number of strips, N, on a parametric surface. In a preferred embodiment the parametric surface is three-dimensional. Surface S(u,v) is first split into N strips in step 110. In the preferred embodiment, in order to provide an even distribution of the shapes, the surface is parameterized of to make all the strips appear of similar height. Typically, the parameterization is not uniform along S(u v). Assume $u_{min}$ and $u_{max}$ are the minimal and the maximal values of the u parameter in the parametric domain of S(u,v), while $v_{min}$ and $v_{max}$ are the bounds of the parameter v. The velocity vector field $$\frac{d}{dv}S(u, v)$$

is calculated during surface subdivision. The velocity vector is used to split surface S(u,v) into strips, with each strip serving as a line of text. Since the parametrization might not be constant, uniform subdivision in the parametric space might yield lines of text that are unequal in height. By deriving $$\frac{d}{dv}S(u, v),$$

it is possible to find a subdivision in the parametric space that yields equal height strips in Euclidean space. In the preferred embodiment the velocity vector is calculated at $$\bar{u} = \frac{u_{min} + u_{max}}{2} \text{ for all } v.$$

Figure 14:
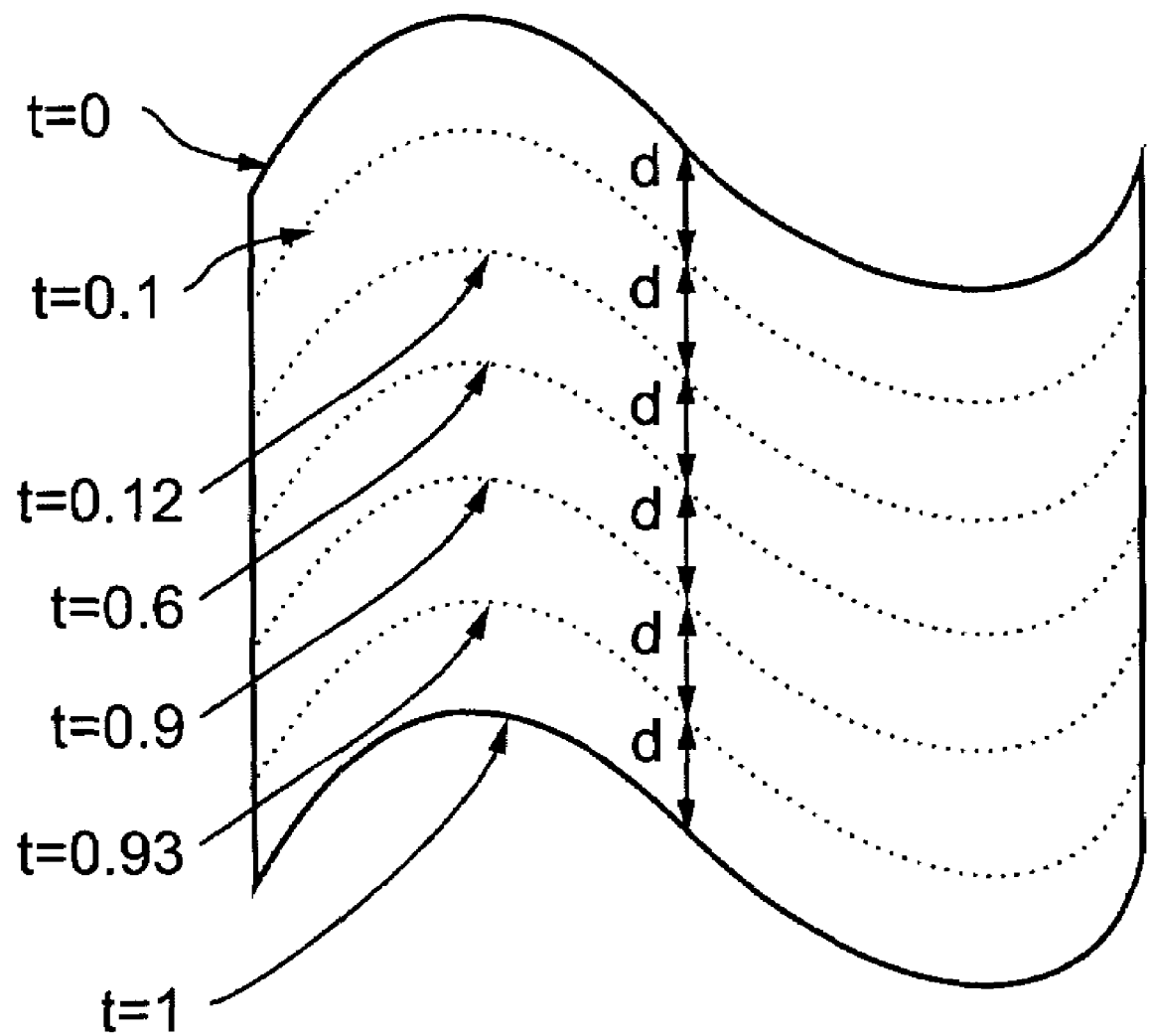
FIG. 14 illustrates splitting a surface S(u,v).

Reference is now made to FIG. 14 which illustrates splitting a surface S(u,v). FIG. 14 illustrates a surface on which the procedure of FIG. 13 is carried out. For a given number of lines of text, N, the value of the parameter $v_i$ for the bottom cut of the i-th strip is approximated so that the following holds:

$$\frac{i}{N}\int_{v_{min}}^{v_{max}}\left\|\frac{d}{dv}S(\bar{u}, v)\right\|dv = \int_{v_{min}}^{v_i}\left\|\frac{d}{dv}S(\bar{u}, v)\right\|dv$$

With the assumption that the value $v_i$ in the above equation does not change much for different values of the u parameter, a uniform distribution of the N strips is derived. In the preferred embodiment the actual computation of $$v_i\bar{u} = \frac{u_{min} + u_{max}}{2}$$

is conducted by performing a binary search over v and a piecewise linear approximation of the arc-length function of $$\int\left\|\frac{d}{dv}S(\bar{u}, v)\right\|dv.$$

As shown in FIG. 13, the arc length of each of the strips on surface S(u,v) is determined in step 112. The arc lengths are used in step 114 to subdivide the plurality of shapes into N subsets, such that each strip is associated with a subset of the shapes. The goal is to have a length of text that is proportional to the arc length of the associated strip. In the preferred embodiment the shape subdivision process is conducted by computing the length of the entire text in relations to the accumulated arc lengths of the base curves of the strips $S_j(u, v_j)$. The text is then broken into the N lines, each of which has a length that is proportional to the arc length of the corresponding strip. The input text is divided into lines of text in such away that the following relation holds:

$$\frac{\int_{u_{min}}^{u_{max}}\left\|\frac{d}{du}S_i(u, v_j)\right\|du}{\sum_{j=1}^{N}\int_{u_{min}}^{u_{max}}\left\|\frac{d}{du}S_i(u, v_j)\right\|du} = \frac{L_i}{\sum_{j=1}^{N} L_j}$$

where Lj is the arc-length of the text in strip j. Finally, each subset of shapes is placed on the associated strip in step 116.

The preferred embodiment comprises the further step of adding shading to at least one of the plurality of shapes, in order to take into account the local shading information of the input surface. In traditional photo-realistic rendering techniques, the pixel is the smallest picture element considered. The pixel is assigned a color value that corresponds to the intensity level computed for the pixel. In the preferred embodiment the traditional rendering process is emulated by defining a weight for each shape. The weight controls various shape parameters, such as the width of a shape outline, or the width or area of a filled symbol, in proportion to the derived intensity level of the shading of the surface in the local neighborhood. In the preferred embodiment the width of the shape outline follows the cosine shader:

$$I_c(u,v) = \omega(I_a + I_d \cdot \langle N(u,v), L \rangle + I_s \cdot \langle R(u,v), V \rangle^\alpha);$$

where:

$$R(u, v) = \frac{L - \tilde{N}(u, v)}{\|L - \tilde{N}(u, v)\|};$$

$$\tilde{N}(u,v) = 2N(u,v)\langle N(u,v), L \rangle$$

and (u, v) are the coordinates of the center of the bounding box of the symbol in the parametric domain of S(u, v), ω is some bias, L is the direction of the light, V stands for the viewing direction, R is the direction of the reflected light, and Ia, Id and Is are the coefficients for the ambient, diffuse and specular components of the illumination. Alpha, α, is a parameter that controls the rate of decay of the specular reflection. The higher alpha is, the faster the decay of the light intensity, as the reflection direction R deviates from the view direction V.

A classic model in the computer graphics field is the Utah teapot. In FIG. 15, two examples of shape placement over the surfaces of the Utah teapot using the cosine shading model, $I_c$, are shown. In FIG. 15a, the maximal width of the outline of the symbol is used if the symbol has the highest intensity level. This is an effective technique when black color is used for the shapes and white background for non-illuminated areas. Another option is to use the negative image, having the darker areas represent the background and the bright ones the illuminated parts of the picture. An additional option comprises expressing the negative colors without altering the background by using the minimal outline width for the illuminated symbols, thus having the symbols with the smaller intensity level producing the outline with the maximal width as shown in FIG. 15b.

Other shaders can be employed to provide different effects. Two examples of such shaders are a silhouette enhancement shader and a distance dependent shader. In the preferred embodiment the intensity level is computed for these two shaders as:

$$I_s(u,v) = \omega \cdot (1.0 - \langle V, N(u,v) \rangle^\gamma);$$

$$I_d(u, v) = \omega \frac{I_c(u, v)}{\|L - S(u, v)\|^\gamma}$$

where $I_s(u, v)$ is the shader that enhances the silhouettes areas and $I_d(u, v)$ is a distance dependent shader, ω is a bias constant, and γ is a decay factor. $I_c(u,v)$ is defined as given above. Silhouette rendering emphasizes the silhouette areas of the surface, while distance dependent rendering is similar to traditional rendering, but assigns larger intensity to the surface regions that are closer to the point light source.

Reference is now made to FIG. 16 which shows a simple example of a text layout over a spherical surface that emphasizes the properties of the shading model. FIG. 16a shows the result obtained by silhouette rendering, $I_s$, whereas FIG. 16b uses traditional cosine shading, $I_c$.

Reference is now made to FIG. 17 which shows examples of the application of the silhouette and the distance shaders. The silhouette shader has been applied to the pawn surface in FIG. 17a, while the distance dependent shader was used for a glass surface in FIG. 17b.

FIG. 18 shows the Utah teapot model rendered using a shader that enhances silhouette areas in the object. FIG. 18b shows a magnified view of the square region of the teapot in FIG. 18a.

It is often easier for the human eye to comprehend the picture when darker colors are used for non-illuminated areas. FIG. 19 shows a Utah teapot having the identical geometry as the teapot of FIG. 15, with the intensities negated with the respect to those in FIG. 15.

In a further preferred embodiment color shading is provided. In the color shading embodiment, the different I components are vectors, thereby supporting a color shader.

Figure 20:
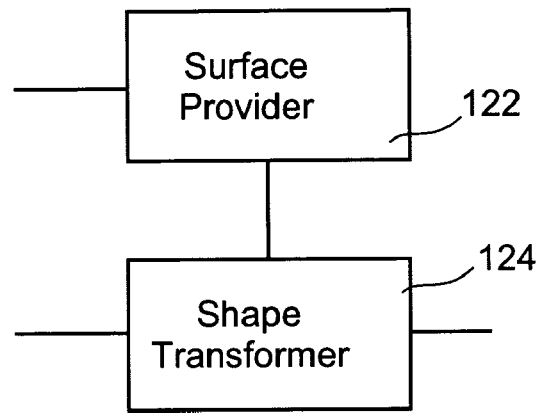
FIG. 20 shows a simplified block diagram of a preferred embodiment of a shape deformer for deforming a plurality of shapes.

Reference is now made to FIG. 20, which shows a simplified block diagram of a preferred embodiment of a shape deformer 120 for deforming a plurality of shapes, wherein each of the shapes comprises a set of parametric curves. Shape deformer 120 comprises surface provider 122 used to provide a parametric surface, and shape transformer 124 used to form each of the shapes into a deformed shape. As in the methods described above, the parametric surface has two parameters varying over a parametric domain, so that each of the parametric curves comprising the shapes lies in the parametric domain of the surface. In a preferred embodiment the parametric shape comprises a PPR shape. In another preferred embodiment, one or more of the parametric curves comprises a PPR curve. Shape transformer 124 forms each shape into a deformed shape, by performing symbolic composition between each of the parametric curves forming the shape and the parametric surface provided by surface provider 122. The output of the shape deformer 120 is a set of deformed parametric curves that specify a plurality of deformed shapes. In a preferred embodiment these curves are output as control points.

Figure 21:
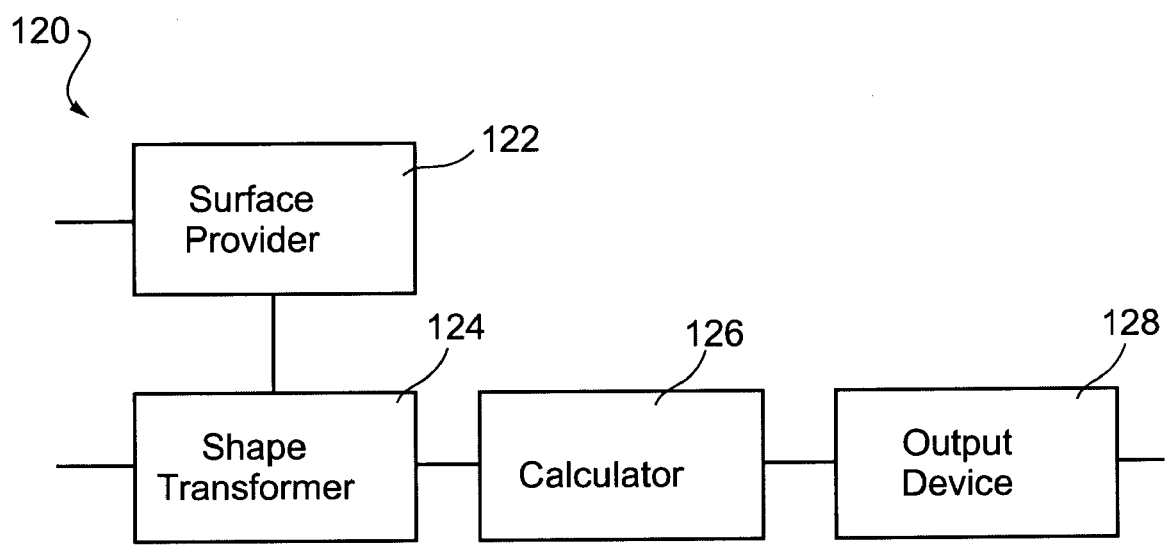
FIG. 21 shows a simplified block diagram of a further preferred embodiment of shape deformer.

Reference is now made to FIG. 21, which shows a simplified block diagram of a further preferred embodiment of shape deformer 120. Parts that are the same as those in previous figures are given the same reference numerals and are not described again except as necessary for an understanding of the present embodiment. In the embodiment of FIG. 21 shape deformer 120 further comprises calculator 126 and output device 128. Calculator 126 calculates the placement of points along each curve comprising the deformed shapes. Output device 128 outputs the calculated points. In a preferred embodiment shape deformer 120 further comprises a display device that displays the deformed shapes. Possible display devices include, but are not limited to: cathode ray tube (CRT), flat panel display, electroluminescent display, gas plasma display, liquid crystal display, laser printer, liquid crystal printer, LED printer, and ink-jet printer.

In a preferred embodiment where one or more of the parametric curves forming the shapes is specified as a set of control points, the shape deformer further comprises a curve regenerator. The curve regenerator forms a parametric representation of the curve from the set of control points. The curve can then be processed by the shape transformer.

Figure 22:
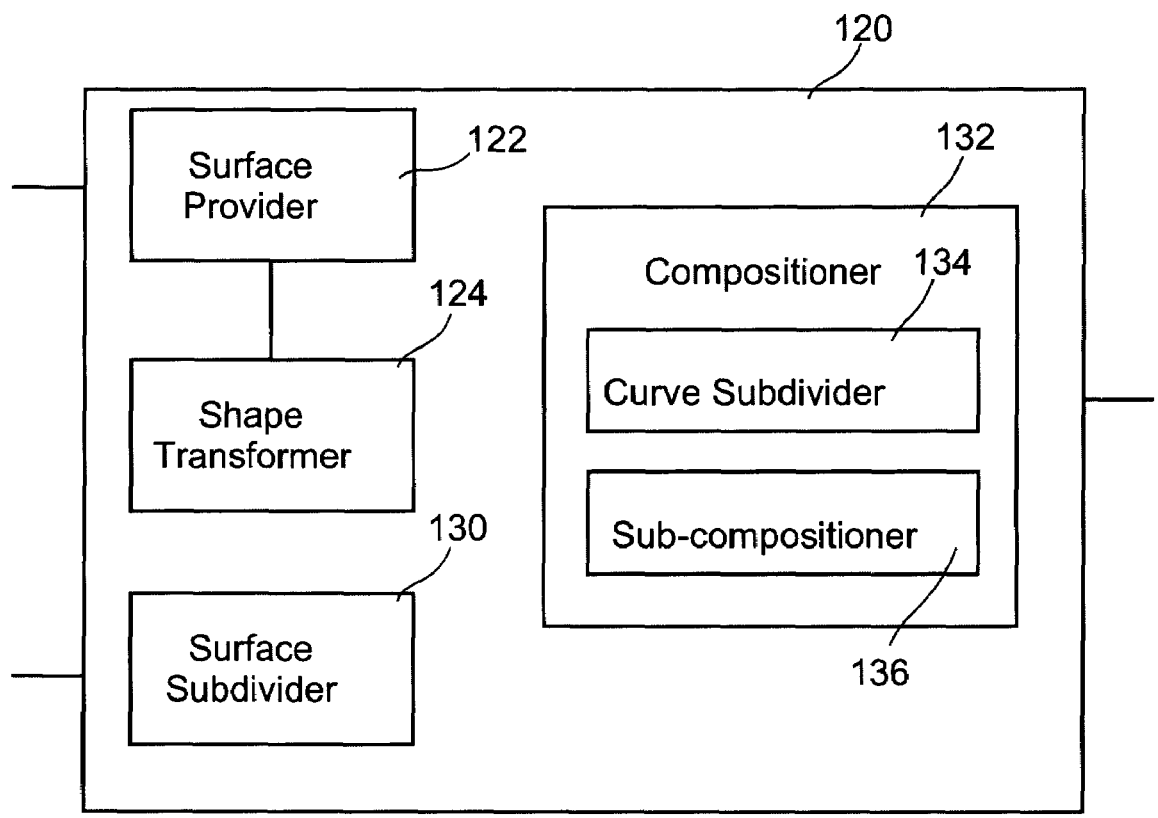
FIG. 22 shows a simplified block diagram of a further preferred embodiment of shape deformer applicable when the parametric surface comprises a PPR surface and all of the parametric curves comprise PPR curves

Reference is now made to FIG. 22, which shows a simplified block diagram of a further preferred embodiment of shape deformer 120 that is applicable when the parametric surface comprises a PPR surface and the parametric curves comprise PPR curves, further comprises a surface subdivider 130 and a compositioner 132. Surface subdivider 130 converts the PPR surface into a set of PR surfaces by subdividing the PPR surface at all its internal knots. Compositioner 132 then performs a symbolic composition between each of the PPR curves and the set of PR surface patches. The compositioner 132 comprises curve subdivider 134 and sub-compositioner 136. Curve subdivider 134 converts the PPR curves into a set of PR segments by subdividing the curve at each value corresponding to an internal knot of the curve and also at each value corresponding to an internal knot of the surface, while sub-compositioner 136 performs a symbolic composition between each of the PR surface patches and the corresponding PR segments.

In a preferred embodiment, shape deformer 120 further comprises a shape placer operable to place the shapes along a defined base curve $\gamma(u)$. The shape placer comprises a base curve provider used to provide a base curve. The base curve is input to surface provider 122, which then provides the parametric surface to be a PPR surface having base curve $\gamma(u)$ as one of the surface's boundaries, generally as the bottom edge.

In a preferred embodiment shape deformer 120 further comprises a base curve reparameterizer. The base curve reparameterizer reparameterizes the base curve, thus providing the capability to resize the shapes.

In a preferred embodiment, shape deformer 120 provides animation capabilities by further comprising an animator. The animator generates successive frames of an image, where the image comprises a set of shapes. The animator generates each frame by providing a parametric surface, and forming a deformed image by performing a symbolic composition between the image and the parametric surface.

Figure 23:
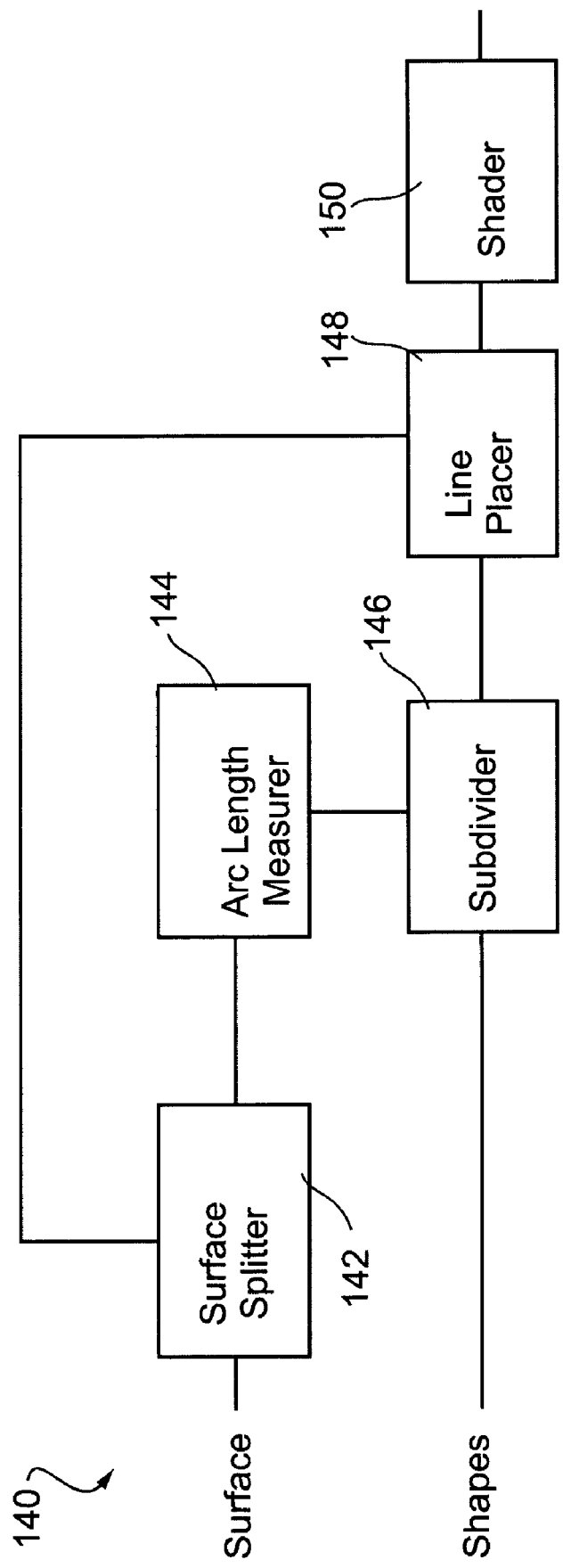
FIG. 23 shows a simplified block diagram of a preferred embodiment of a 3D placer for placing shapes on N strips on a three dimensional shape

Reference is now made to FIG. 23, which shows a simplified block diagram of a preferred embodiment of a 3D placer 140 operable to place shapes on N strips on a parametric surface, preferably a three-dimensional surface. The 3D placer 140 comprises surface divider 142 operable to split the surface into N strips, an arc length measurer 144 operable to determine the arc length of each of the strips, a subdivider 146 operable to subdivide the shapes into N subsets, and a line placer 148 operable to place each subset of shapes on the surface. Subdivider 146 subdivides the shapes into subsets so that the size of each subset is determined by the relative arc lengths of the strips, and associates each strip on the surface with a subset of the shapes. Line placer 148 then places each subset of shapes on the associated strip using the technique described above. The preferred embodiment further comprises a shader 150 that adds a shading effect in order to incorporate information about lighting conditions.

An additional preferred embodiment comprises a computer program product directly loadable into the internal memory of a digital computing device. The computer program product comprises software code portions for deforming a plurality of shapes in the manner described above. The computer program product is providable in a variety of media, including: compact disc (CD), digital versatile disc (DVD), floppy disk, hard disk, magnetic tape, or by download from a server via a computer network.

It can be shown that the deformation technique of the preferred embodiments prevents self intersections when the base curve is either monotone with respect to some line or is closed. Let $\gamma(t)$ be a $C^1$ continuous curve, and assume $\gamma(t)$ is either monotone with respect to some line or is closed. Then, Proposition Let $\bar{\gamma}(t)$ be the offset curve of $\gamma(t)$. Suppose that the curves $\bar{\gamma}(t)$ and $\gamma(t)$ are simple and mutually intersection free. Then, the ruled surface $S(u, v)=\gamma(u)(1-v)+\bar{\gamma}(u)v$ is self intersection free as well.

The proof of this proposition may be found in T. Samoilov and G. Elber. "Self-intersection elimination in metamorphosis of two-dimensional curves", *The Visual Computer*, 14(8/9): 415-428, 1998, since the tangent vectors of both curves $\gamma(u)$ and $\bar{\gamma}(u)$ are collinear throughout the parametric domain of u. Thus, if the offset curve of $\bar{\gamma}(u)$ is simple and does not intersect $\gamma(u)$, the resulting text would have no fold-overs.

Figure 24:
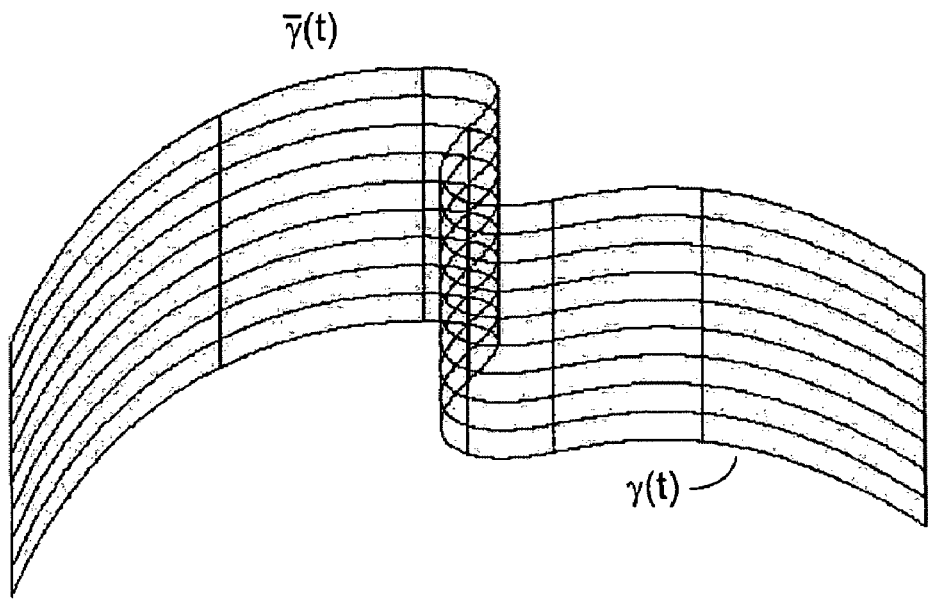
FIG. 24 shows a surface with self intersections.

While rare, the constraint for $\gamma(t)$ to be either closed or monotone is sufficient but unnecessary. This constraint prevents the singular case for which the end points of $\gamma(t)$ and the end points of $\bar{\gamma}(t)$ are interleaved, resulting in two simple curves that do not intersect whereas the ruled surface between the curves does self intersect. The prevention of self intersections in the isoparametric curve $S(u, 1)$ could also be materialized by providing $S(u, 1)$ to be a translated version of the base curve $\gamma(t)$. This solution could yield self intersections in $S(u,v)$, as demonstrated in FIG. 24, and hence, to possible intersections in the composed text.

Some of the above embodiments use precise composition between the PPR curves, such as linear or cubic Bezier curves, and arbitrary PPR surfaces, such as Bezier surfaces. Thus, the order of the resulting curves might be higher than 3 (cubic). The PostScript language, for example, supports either linear or cubic Bezier curves. The geometry of the composed letters can be approximated by a set of cubic Bezier curves to an arbitrary precision, as shown in G. Elber "Free form surface analysis using a hybrid of symbolic and numeric computation", Ph.D. dissertation, 1992, in order to further use the composed letters in the PostScript representation.

Figure 25A:
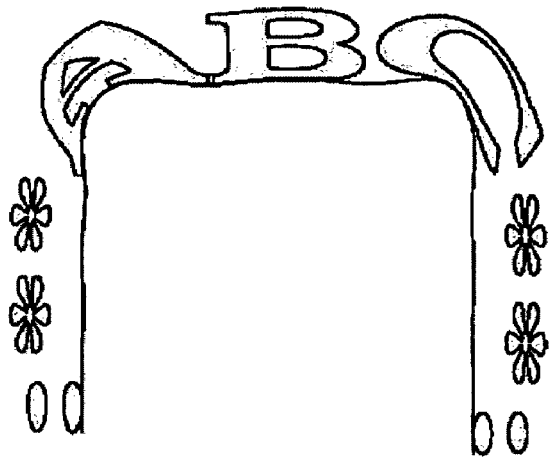
FIGS. 25A, 25b show two representations of a plurality of shapes deformed over a curve.
Figure 25B:
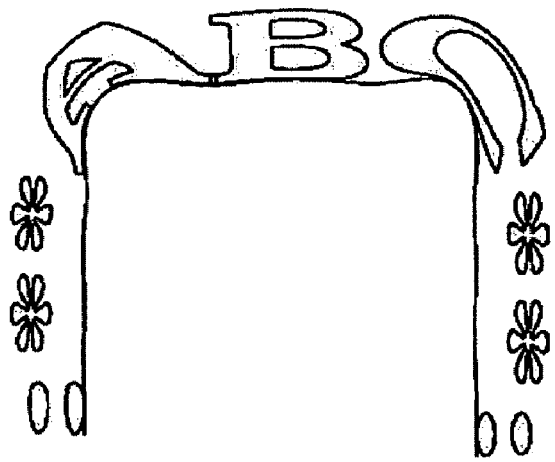

FIG. 25 shows two representations of the same string placed over the same curve. The surface $S(u, v)$ is cubic by linear resulting in composed curve of degree 12 for cubic Bezier and of degree 4 for linear Bezier curve segments. The curves in FIG. 25a are approximated by piecewise linear segments, whereas the same curves in FIG. 25b are represented by cubic Bezier curves. The number of linear segments for each high order curve is equal to 7 in this example. The maximal number of cubic Bezier segments approximating a higher order curve that was received as a result of the composition of the outline font representation with the surface patch is two.

The method and apparatus described above provide a precise technique for layout of shapes along free-form parametric curves and surfaces. In order to achieve a smooth or aesthetically pleasing looking text deformation, the geometric representation of the shapes is symbolically composed with a parametric surface along a given base curve. Additional information about the shape may be provided by shading effects. The shape deformation technique of the present embodiment is directly applicable to outline font shaping and placement for use in digital typography.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A computer implemented method for deforming a plurality of shapes, each said shape being a character in a font set having a font style, said deforming preserving said font style, wherein each of said shapes comprises a set of parametric curves, said method comprising:
provided a parametric surface having a first and a second parameter varying over a parametric domain, such that each said parametric curve lies in the parametric domain of said surface;
for each of said shapes, forming a deformed character shape according to said parametric surface by performing a symbolic composition between said parametric surface and each said parametric curve thereby to generate a set of deformed parametric curves, each one of the plurality of shapes being a shape of a character; and
for each of said shapes, outputting said deformed character shape while preserving said font style.

2. A method for deforming a plurality of shapes according to claim 1, wherein said parametric surface comprises a piecewise polynomial or rational (PPR) surface.

3. A method for deforming a plurality of shapes according to claim 2, wherein all of said parametric curves comprise PPR curves.

4. A method for deforming a plurality of shapes according to claim 3, wherein performing said symbolic composition between said PPR surface and each of said PPR curves comprises:
converting said PPR surface into a set of polynomial or rational (PR) patches by subdividing said surface at all its internal knots;
converting each of said PPR curves into a set of PR segments by subdividing said curve at each value corresponding to an internal knot of the curve and also at each value corresponding to an internal knot of said surface; and, performing a symbolic composition between each of said PR patches and each PR segment within the parametric domain of said PR patch.

5. A method for deforming a plurality of shapes according to claim 2, wherein a PPR surface comprises one of the following surfaces: polynomial spline, Hermite, Lagrange, Bezier, and B-spline.

6. A method for deforming a plurality of shapes according to claim 2, further comprising placing said plurality of shapes along a base curve by: providing a base curve; and,
providing said surface to be a PPR surface such that, when said second parameter equals a predefined value, said surface unites with said base curve.

7. A method for deforming a plurality of shapes according to claim 6, wherein said base curve is provided by interfacing with a user.

8. A method for deforming a plurality of shapes according to claim 6, further comprising reparameterizing said base curve for arc length.

9. A method for deforming a plurality of shapes according to claim 6, wherein providing said surface to be a PPR surface further comprises providing said surface such that said surface unites with a predefined shape curve when said first parameter is at any constant value in the parametric domain of said surface.

10. A method for deforming a plurality of shapes according to claim 1, wherein at least one of said parametric curves comprises a PPR curve.

11. A method for deforming a plurality of shapes according to claim 10, wherein a PPR curve comprises one of the following curves: polynomial spline, Hermite, Lagrange, Bezier, and B-spline.

12. A method for deforming a plurality of shapes according to claim 1, wherein all of said parametric curves comprise PPR curves.

13. A method for deforming a plurality of shapes according to claim 1, wherein at least one of said parametric curves comprises a set of control points, and wherein said method further comprises forming a parametric representation of said parametric curve from said set of control points.

14. A method for deforming a plurality of shapes according to claim 1, wherein said surface is provided by interfacing with a user.

15. A method for deforming a plurality of shapes according to claim 1, further comprising:
calculating the placement of a plurality of points along each curve from the set of deformed parametric curves comprising each said deformed character shape; and, outputting said points.

16. A method for deforming a plurality of shapes according to claim 15, further comprising displaying plurality of deformed character shapes.

17. A method for deforming a plurality of shapes according to claim 16, wherein said points are displayed by one of a group of devices comprising: cathode ray tube (CRT), flat panel display, electroluminescent display, gas plasma display, liquid crystal display, laser printer, liquid crystal printer, LED printer, and ink jet printer.

18. A method for deforming a plurality of shapes according to claim 1, wherein said shapes comprise members of an outline font.

19. A method for deforming a plurality of shapes according to claim 1, wherein said plurality of shapes comprises a sequence of shapes.

20. A method for deforming a plurality of shapes according to claim 1, wherein said plurality of shapes comprises a single shape.

21. A method for deforming a plurality of shapes according to claim 1, wherein said set of parametric curves comprises a single parametric curve.

22. A method for deforming a plurality of shapes according to claim 1, wherein at least one of said parametric curves comprises a Bezier curve.

23. A method for deforming a plurality of shapes according to claim 1, wherein said parametric surface comprises a PPR surface derived from a PPR base curve.

24. A method for deforming a plurality of shapes according to claim 23, wherein said PPR surface is further derived from a PPR shape curve.

25. A method for deforming a plurality of shapes according to claim 23, wherein said surface and said base curve are planar.

26. A method for deforming a plurality of shapes according to claim 1, wherein said surface is planar.

27. A method for deforming a plurality of shapes according to claim 1, further comprising providing animation effects by generating successive frames of an image, said image comprising said plurality of shapes, wherein generating a frame comprises:
providing a parametric surface; and,
for each of said shapes, forming a deformed shape according to said parametric surface.

28. A method for deforming a plurality of shapes according to claim 27, wherein generating a frame further comprises placing said plurality of shapes along a base curve by:
providing a PPR base curve; and,
providing said surface to be a PPR surface such that, when said second parameter equals a predefined value, said surface unites with said base curve.

29. A method for deforming a plurality of shapes according to claim 28, wherein generating a frame further comprises reparameterizing said base curve for arc length.

30. A method for deforming a plurality of shapes according to claim 1, wherein said surface comprises a three dimensional parametric surface, said method further comprising placing said plurality of shapes on a predefined number of strips on said three dimensional surface by:
splitting said surface into said number of strips;
determining the arc length of each of said strips;
subdividing said plurality of shapes into said number of strips, such that each strip on said surface is associated with a subset of said shapes, wherein the size of each subset is determined by the relative arc lengths of said strips; and, placing each subset of shapes on said associated strip.

31. A method for deforming a plurality of shapes according to claim 30, further comprising shading at least one of said plurality of shapes.

32. A method for deforming a plurality of shapes according to claim 31, wherein shading one of said shapes comprises controlling the width of at least one of said curves comprising said shape.

33. A method for deforming a plurality of shapes according to claim 31, wherein shading one of said shapes comprises assigning a weight to said shape thereby to control a property thereof.

34. A method for deforming a plurality of shapes according to claim 33, wherein said weighting comprises a vector thereby to provide color shading.

35. A method for deforming a plurality of shapes according to claim 31, wherein said shading is determined by at least one of the following factors: light intensity, light direction, viewing direction, direction of the reflected light, ambient light, diffuse light, specular light, silhouette enhancement, and distance.

36. A method for deforming a plurality of shapes according to claim 31, wherein said shading comprises color shading.

37. A computer-based shape deformer for deforming a plurality of shapes, each said shape being a character in a font set having a font style, said deforming preserving said font style, wherein each of said shapes comprises a set of parametric curves, said deformer comprising:
a surface provider for providing a parametric surface having a first and a second parameter varying over a parametric domain, such that each of said parametric curves lies in the parametric domain of said surface;
a symbolic composition shape transformer for forming each of said shapes into a deformed character shape according to said parametric surface, by performing for each of said shapes a symbolic composition between said parametric surface and each said parametric curve, to generate a set of deformed parametric curves, each one of the plurality of shapes being a shape of a character; and
an output interface for outputting said deformed character shape while preserving said font style.

38. The computer-based shape deformer according to claim 37, wherein said parametric surface comprises a piecewise polynomial or rational (PPR) surface.

39. The computer-based shape deformer according to claim 38, wherein all of said parametric curves comprise PPR curves.

40. The computer-based shape deformer according to claim 39, wherein said shape transformer comprises a surface subdivider for converting said surface into a set of polynomial or rational (PR) patches by subdividing said PPR surface at all its internal knots, a curve subdivider for converting each of said PPR curves into a set of PR segments by subdividing said curve at each value corresponding to an internal knot of the curve and also at each value corresponding to an internal knot of said surface, and a sub-compositioner for performing a symbolic composition between each of said PR patches and the corresponding PR segments.

41. The computer-based shape deformer according to claim 37, wherein at least one of said parametric curves comprises a PPR curve.

42. The computer-based shape deformer according to claim 37, wherein all of said parametric curves comprise PPR curves.

43. The computer-based shape deformer according to claim 37, further comprising an interface for interfacing with a user thereby to provide said surface.

44. The computer-based shape deformer according to claim 37, wherein at least one of said parametric curves comprises a set of control points, and wherein said shape deformer further comprises a curve regenerator for forming a parametric representation of said parametric curve from said set of control points.

45. The computer-based shape deformer according to claim 37, further comprising a calculator for calculating the placement of a plurality of points along each curve from the set of deformed parametric curves comprising each said deformed character shape, and an output device for outputting said points.

46. The computer-based shape deformer according to claim 45, further comprising a display device for displaying plurality of deformed character shapes.

47. The computer-based shape deformer according to claim 46, wherein said display device is one of a group of devices comprising: cathode ray tube (CRT), flat panel display, electroluminescent display, gas plasma display, liquid crystal display, laser printer, liquid crystal printer, LED printer, and ink jet printer.

48. The computer-based shape deformer according to claim 45, further comprising an animator for generating successive frames form an image, said image comprising said plurality of shapes, wherein for each frame said animator provides a parametric surface, to form a deformed plurality of shapes according to said parametric surface, to calculate the placement of a plurality of points along each of said deformed shapes, and to output said points.

49. The computer-based shape deformer according to claim 48, wherein said animator places said plurality of shapes along a PPR base curve by providing said surface to be a PPR surface such that, when said second parameter equals a predefined value, said surface unites with said base curve.

50. The computer-based shape deformer according to claim 49, wherein said animator reparameterizes said base curve for arc length.

51. The computer-based shape deformer according to claim 37, wherein said shapes comprise members of an outline font.

52. The computer-based shape deformer according to claim 37, wherein said plurality of shapes comprises a sequence of shapes.

53. The computer-based shape deformer according to claim 37, wherein said plurality of shapes comprises a single shape.

54. The computer-based shape deformer according to claim 37, wherein said set of parametric curves comprises a single parametric curve.

55. The computer-based shape deformer according to claim 37, wherein at least one of said parametric curves comprises a Bezier curve.

56. The computer-based shape deformer according to claim 37, wherein said parametric surface comprises a PPR surface derived from a PPR base curve.

57. The computer-based shape deformer according to claim 56, wherein said parametric surface comprises a PPR surface derived from a PPR base curve and a PPR shape curve.

58. The computer-based shape deformer according to claim 56, wherein said parametric surface comprises a B-spline surface derived from a B-spline base curve.

59. The computer-based shape deformer according to claim 56, wherein said surface and said base curve are planar.

60. The computer-based shape deformer according to claim 37, further comprising a shape placer for placing said plurality of shapes along a base curve, wherein said shape placer comprises a base curve provider for providing a PPR base curve, and wherein said surface provider provides said surface to be a PPR surface such that, when said second parameter equals a predefined value, said surface unites with said base curve.

61. The computer-based shape deformer according to claim 60, wherein said interface interfaces with a user thereby to provide said base curve.

62. The computer-based shape deformer according to claim 60, further comprising a base curve reparameterizer for reparameterizing said base curve thereby to resize said shapes.

63. The computer-based shape deformer according to claim 62, wherein said base curve reparameterizer reparameterizes said base curve such that the sizing of said shapes after deformation corresponds to the sizing of said shapes prior to deformation.

64. The computer-based shape deformer according claim 62, wherein said base curve reparameterizer reparameterizes said base curve such that selected shapes are emphasized.

65. The computer-based shape deformer according to claim 60, wherein said surface provider provides said surface to be a PPR surface such that said surface unites with a predefined PPR shape curve when said first parameter is at any constant value in the parametric domain of said surface.

66. The computer-based shape deformer according to claim 37, wherein said surface comprises a three dimensional parametric surface, and wherein said shape deformer further comprises a 3D placer for placing said plurality of shapes on a predefined number of strips on said three dimensional surface, said 3D placer comprising a surface splitter for splitting said surface into said number of strips, an arc length measurer for determining the arc length of each of said strips, a subdivider for subdividing said plurality of shapes into said number strips, such that each strip on said surface is associated with a subset of said shapes, wherein the size of each subset is determined by the relative lengths of said strips, and a line placer placing each subset of shapes on said associated strip.

67. The computer-based shape deformer according to claim 66, wherein said 3D placer further comprises a shader for shading at least one of said plurality of shapes.

68. The computer-based shape deformer according to claim 67, wherein shading one of said shapes comprises controlling the width of at least one of said curves comprising said shape.

69. The computer-based shape deformer according to claim 67, wherein shading one of said shapes comprises assigning a weight to said shape thereby to control a property thereof.

70. The computer-based shape deformer according to claim 69, wherein said weighting comprises a vector thereby to provide color shading.

71. The computer-based shape deformer according to claim 67, wherein said shading is determined by at least one of the following factors: light intensity, light direction, viewing direction, direction of the reflected light, ambient light, diffuse light, specular light, silhouette enhancement, and distance.

72. The computer-based shape deformer according to claim 67, wherein said shading comprises color shading.

73. A computer program product in a computer-readable storage device, the computer program product comprising software code portions which when executed on a computing device deform a plurality of shapes, each said shape being a character in a font set having a font style, said deforming preserving said font style, wherein each of said shapes comprises a set of parametric curves, by performing the steps of:
   providing a parametric surface having a first and a second parameter varying over a parametric domain, such that each of said parametric curves comprising said shapes lies in the parametric domain of said parametric surface;
   for each of said shapes, forming a deformed character shape according to said parametric surface by performing a symbolic composition between said parametric surface and each said parametric curve thereby to generate a set of deformed parametric curves, each one of the plurality of shapes being a shape of a character; and
   for each of said shapes, outputting said deformed character shape while preserving said font style.

74. A computer program product according to claim 73, wherein said product is located on a server for download into said digital computing device via a computer network.

75. A computer program product according to claim 73, wherein said product is located on one of a group of storage media comprising: compact disc (CD), digital versatile disc (DVD), floppy disk, hard disk, and magnetic tape.

76. A computer program product according to claim 73, comprising further software code portions for performing the steps of:
   calculating the placement of a plurality of points along each curve from the set of deformed parametric curves comprising each of said shapes; and
   outputting said points.

77. A computer program product according to claim 76, comprising further software code portions for performing the step of displaying plurality of deformed character shapes.

78. A computer program product according to claim 76, comprising further software code portions for performing the step of providing animation effects by generating successive frames of an image, said image comprising said plurality of shapes, wherein generating a frame comprises:
   providing a parametric surface; and,
   for each of said shapes, forming a deformed shape according to said parametric surface.

79. A computer program product according to claim 73, wherein said shapes comprise members of an outline font.

80. A computer program product according to claim 73, wherein at least one of said parametric curves comprises a Bezier curve.

81. A computer program product according to claim 73, wherein said parametric surface comprises a B-spline surface derived from a B-spline base curve.

82. A computer program product according to claim 81, comprising further software code portions for performing the step of placing said plurality of shapes along a base curve by:
providing a base curve; and,
providing said surface to be a piecewise polynomial or rational (PPR) surface such that, when said second parameter equals a predefined value, said surface unites with said base curve.

83. A computer program product according to claim 82, comprising further software code portions for performing the step of reparameterizing said base curve for arc length.

84. A computer program product according to claim 73, wherein said parametric surface comprises a piecewise polynomial or rational (PPR) surface and all of said parametric curves comprise PPR curves, and wherein performing said symbolic composition between said surface and each of said PPR curves comprises:
converting said PPR surface into a set of polynomial or rational (PR) patches by subdividing said surface at all its internal knots;
converting each of said PPR curves into a set of PR segments by subdividing said curve at each value corresponding to an internal knot of the curve and also at each value corresponding to an internal knot of said surface; and,
performing a symbolic composition between each of said PR patches and each PR segment within the parametric domain of said PR patch.

85. A computer program product according to claim 73, wherein said surface comprises a three dimensional parametric surface, the program product further comprising software code portions for performing the step of placing said plurality of shapes on a predefined number of strips on said three dimensional surface by:
splitting said surface into said number of strips;
determining the arc length of each of said strips;
subdividing said plurality of shapes into said number strips, such that each strip on said surface is associated with a subset of said shapes, wherein the size of each subset is determined by the relative arc lengths of said strips; and
placing each subset of shapes on said associated strip.

86. A computer program product according to claim 85, comprising further software code portions for performing the step of shading at least one of said plurality of shapes.

* * * * *